United States Patent [19]

Aikoh et al.

[11] Patent Number: 4,933,934
[45] Date of Patent: Jun. 12, 1990

[54] TIME DIVISION MULTIPLEXING METHOD WITH CHANNEL COMPRESSION AND A DEVICE THEREFOR

[75] Inventors: Shinichi Aikoh; Akira Kanemasa, both of Tokyo, Japan

[73] Assignee: NEC Corporation, Japan

[21] Appl. No.: 136,137

[22] Filed: Dec. 21, 1987

[30] Foreign Application Priority Data

Dec. 22, 1986 [JP] Japan ............................. 61-303943
Dec. 22, 1986 [JP] Japan ............................. 61-303944
Jan. 23, 1987 [JP] Japan ............................. 62-14904
Jan. 27, 1987 [JP] Japan ............................. 62-17601

[51] Int. Cl.$^5$ ............................. H04J 3/17; H04J 3/12
[52] U.S. Cl. ............................. 370/80; 370/112
[58] Field of Search ............... 370/80, 84, 112, 102, 370/81

[56] References Cited

U.S. PATENT DOCUMENTS

| | | | |
|---|---|---|---|
| 3,982,077 | 9/1976 | Clark et al. | 370/84 |
| 4,271,508 | 6/1981 | Schenk | 370/112 |
| 4,377,861 | 3/1983 | Huffman | 370/112 |
| 4,589,108 | 5/1986 | Billy | 370/112 |
| 4,719,624 | 1/1988 | Bellisio | 370/112 |

Primary Examiner—Douglas W. Olms
Assistant Examiner—Wellington Chin
Attorney, Agent, or Firm—Laff, Whitesel, Conte & Saret

[57] ABSTRACT

In a time division multiplexing method or device wherein first through N-th-channel samples are extracted at first through M-th unit intervals which correspond to first through M-th bit rates of first through N-th-channel input signals, where M is equal to or less than N, a control signal is produced in response to the input signals to indicate first through M-th consecutive fields in each of successive frames of a time division multiplexed signal and to indicate whether the samples are significant or insignificant samples in each frame. The first through the M-th fields correspond to the unit intervals and have a predetermined total time duration in each frame. The control signal is used moreover to arrange the samples in the fields of each frame by selecting the significant samples with preference to the insignificant samples. Together with the control signal, a sample arrangement information signal is produced to indicate arrangement of the samples in each frame and is arranged in an information field which remains in each frame. Depending on the number of the samples arranged in each field with the unit interval corresponding to the field under consideration, time durations of the fields may vary from frame to frame.

17 Claims, 6 Drawing Sheets

TIME DIVISION MULTIPLEXING METHOD WITH CHANNEL COMPRESSION AND A DEVICE THEREFOR

BACKGROUND OF THE INVENTION

This invention relates to a method of time division multiplexing input signals into an output signal having a frame period which defines successive frames of the output signal. This invention relates also to a device for use in carrying out the method.

It is possible to understand that the input signals are received through first through N-th channels, where N represents an integer greater than one. In this event, the input signals are identified by first through N-th channel numbers.

In general, the input signals have a common bit rate. The common bit rate is, for example, 64 kbps (kilobits per second) when each of the input signals is a pulse code modulated (PCM) signal for a speech signal and when the integer N is equal to twenty-four. In this case, the output signal has a bit rate of 1.544 Mbps (megabits per second). First through N-th samples are extracted in the frame period from the respective input signals at a unit interval corresponding to the common bit rate. The first through the N-th samples are arranged in first through N-th fields in each of the frames. The first through the N-th fields have a time duration in common.

Thus, the first through the N-th fields are exclusively or fixedly assigned to the input signals of the first through the N-th channel numbers, respectively.

The first through the N-th samples are classifiable into significant and insignificant samples in each of the frames. The significant samples are obtained from the first through the N-th input signals when a significant signal is present in each of the first through the N-th channels. The significant signal is, for example, the speech signal, a data signal, and a video signal when the first through the N-th channels are telephone channels, data channels, and video channels, respectively. The significant signal is never continuously present. That is, each pause is interposed between the significant signals. The insignificant samples are obtained within the pauses.

When a person speaks, the pauses are present in the speech. It is statistically known in the art that the pauses last in total about 60 percent of a total duration of the speech. This likewise applies also when the significant signal is the data signal or the video signal.

The output signal is transmitted to a digital transmission line. In order to effectively utilize the digital transmission line, the significant samples may be transmitted to the digital transmission line as the output signal with preference to the insignificant samples. In accordance with this method, it is possible to transmit the input signals of as much as one hundred telephone channels while the input signals of only forty-eight channels are transmitted when all the significant and the insignificant samples are dealt with.

A method of dealing with the significant samples with preference to the insignificant samples, is described in an article contributed by Rikio MARUTA et al to IEEE Transactions On Communications, Vol. COM-29, No. 3 (March 1981), pages 337–345, under the title of "Design and Performance of a DSI Terminal for Domestic Applications." It is to be noted that the Maruta et al article refers to only a case where the input signals have the common bit rate. In other words, the Maruta et al article does not disclose an application to another case where the input signals have different bit rates which will herein be called first through M-th bit rates, where M represents a natural number which is not greater than the integer N. It should also be noted for such different rates that the samples of the respective input signals would have to be extracted at different unit intervals or periods, which may be referred to as first through M-th unit intervals and be understood to be in one-to-one correspondence to the first through the M-th bit rates.

A time division multiplexing method for the input signals of different bit rates is described in a paper contributed by Yutaka MORIYAMA et al to IEEE Global Telecommunication Conference, CH2190-7 (1985), pages 552–556, under the title of "Digital Multimedia Information Multiplexer." With the Moriyama et al paper, it is impossible to effectively utilize the digital transmission line. This is because all of the significant samples and the insignificant samples are transmitted to the digital transmission line without preference to the insignificant samples.

SUMMARY OF THE INVENTION

It is therefore an object of this invention to provide a method of time division multiplexing signals received through a plurality of channels as input signals and having different bit rates into an output signal for a digital transmission line, which method is capable of effectively utilizing the digital transmission line.

It is another object of this invention to provide a method of the type described, which is capable of time division multiplexing the input signals into the output signal with the number of channels compressed in the output signal.

Other objects of this invention will become clear as the description proceeds.

This invention is applicable time division multiplexing input signals which are identified by a first through an N-th channel number and which are a first through an M-th bit rate in an output signal having a predetermined frame period, which defines successive frames of the output signal. The letter N represents an integer which is greater than one and M represents a natural number which is not greater than the integer.

According to this invention, a method comprises the steps of: (A) extracting a first through an N-th sample in the frame period from the respective input signals at a first through an M-th unit interval which are in a one-to-one correspondence with the first through the M-th bit rates, the first through the N-th samples being identified by the first through the N-th channel numbers, respectively, and being classifiable into significant and insignificant samples in each of the frames; (B) producing a control signal in response to the input signals of the first through the N-th channel numbers, the control signal indicating a first through an M-th field successively consecutively in each of the frames and furthermore indicating whether the first through the N-th samples are the significant or the insignificant samples in the respective frames, the first through the M-th fields of each of said frames being in one-to-one correspondence to the first through the M-th unit intervals and having a total time duration which is equal to the frame period minus a predetermined time duration; (C) changing the control signal to a sample arrangement information signal indicative of the first through the M-th fields in each of the frames; and (D) arranging the first through the N-th samples in the first through the M-th fields of the respective frames in response to the control signal to produce the output signal with the significant samples selected in each of the frames with preference to the insignificant samples and with the sample arrangement information signal placed in an information field which has the predetermined time duration in each of the frames.

This invention is applicable to time division multiplexing input signals which are identified by a first through an N-th channel number and which have a first througth an M-th bit rate. An output signal has a predetermined frame period which defines successive frames of the output signal. The letter N represents an integer which is greater than one and M represents a natural number which is not greater than said integer. According to this invention, the device comprises: (A) extracting means responsive to the respective input signals for extracting a first through an N-th sample in the frame period from the respective input signals at a first through an M-th unit interval which are in one-to-one correspondence to the first through the M-th bit rates, the first through the N-th samples being identified by the first through the N-th channel numbers, respectively, and being classifiable into significant and insignificant samples in each of the frames; (B) producing means responsive to the input signals of the first through the N-th channel numbers for producing a control signal indicating a first through an M-th field successively consecutively in each of the frames and furthermore indicating whether the first through the N-th samples are the significant or the insignificant samples in the respective frames, the first through the M-th fields of each of said frames being in a one-to-one correspondence with the first through the M-th unit intervals and having a total time duration which is equal to the frame period minus a predetermined time duration; (C) changing means for changing the control signal to a sample arrangement information signal which is indicative of the first through the M-th fields in each of the frames; and (D) arranging means responsive to the control signal for arranging the first through the N-th samples in the first through the M-th fields of the respective frames to produce the output signal with the significant samples selected in each of the frames with preference to the insignificant samples and with the sample arrangement information signal placed in an information filed which has the predetermined time duration in each of the frames.

DESCRIPTION OF THE PREFERRED EMBODIMENTS

Figure 1:
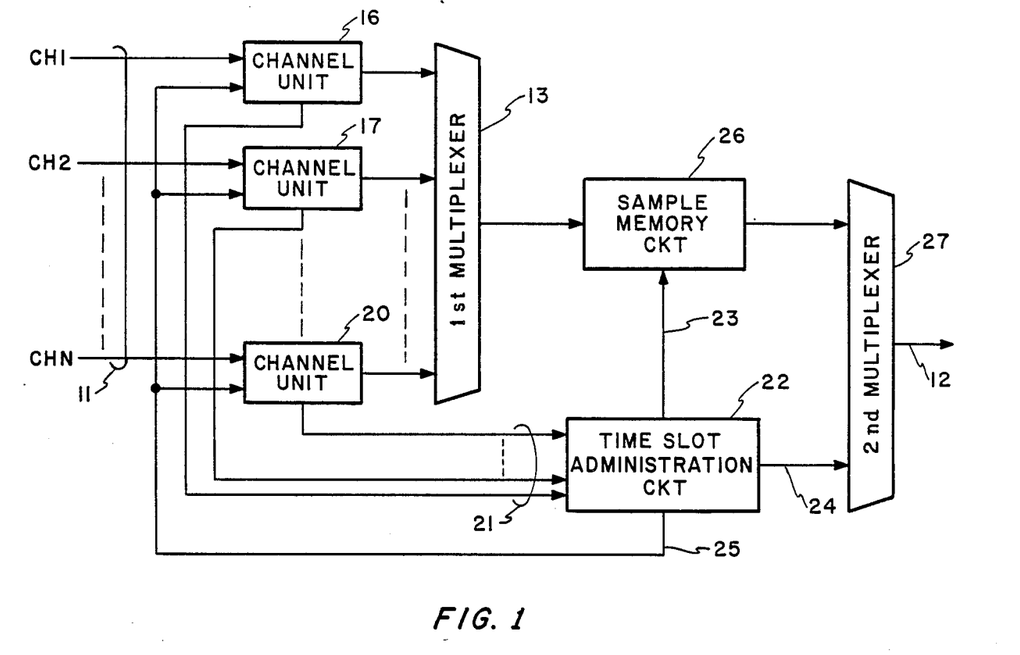
FIG. 1 is a block diagram of a time division multiplexing device for use in carrying out a method according to an embodiment of this invention.

Referring to FIG. 1, description will be made as regards a time division multiplexing device for use in carrying out a method according to a preferred embodiment of this invention. The device is for time division multiplexing input signals 11 into an output signal 12 having a predetermined frame period which defines successive frames of the output signal 12. The input signals 11 are received through first through N-th channels CH1, ..., and CHN, where N represents an integer greater than one. The input signals 11 are therefore identified by first though N-th channel numbers. The input signals have first through M-th bit rates, where M represents a natural number which is not greater than the integer N.

The device comprises a first multiplexer 13 which responds to the input signals 11 received through first through N-th channel units or modules 16, 17, ..., and 20 for the first through the N-th channels CH1 to CHN. The first through the N-th channel units 16 to 20 are for detecting channel state information of the first through the N-th channels CH1 to CHN to produce detection signals 21 representative of the channel state information of the first through the N-th channels CH1 to CHN, respectively. In the example being illustrated, the first through the N-th channel units 16 to 20 detects the channel state information of the first through the N-th channels CH1 to CHN in a time division fashion. More specifically, the first through the N-th channel units 16 to 20 produce the respective detection signals 21 in the order of the channel numbers of the first through the N-th channel units 16 to 20.

Each of the channel state information of the first through the N-th channels CH1 to CHN represents whether or not each of the input signals 11 of the first through the N-th channels CH1 to CHN is a significant signal. Each input signal is and is not a significant signal when the input signal represents, for example, voiced or voiceless sound and a pause between the sound. The channel having the significant signal will be called an active channel while the channel having no significant signal will be called an inactive channel.

The channel state information of the first through the N-th channels CH1 to CHN furthermore represents the bit rates of the input signals 11 of the first through the N-th channels CH1 to CHN.

By the first multiplexer 13, the input signals 11 received through the first through the N-th channel units 16 to 20 are multiplexed in a time division fashion into a first multiplexed signal. The first multiplexed signal comprises first through N-th samples which are derived from the first through N-th signals, respectively. The first through the N-th samples are extracted in the frame period from the respective input signals 11. Each of the first through the N-th samples occupies a selected one of first through M-th unit intervals or durations in each frame period. The first through the M-th unit intervals are in one-to-one correspondence to the first through the M-th bit rates in the manner known in the art. The first through the N-th samples are identified by the first through the N-th channel numbers, respectively, and are classifiable into significant and insignificant samples in each of the frames when the input signals 11 are and are not, respectively, the significant signals.

Thus, the first multiplexer 13 is operable as an extracting circuit responsive to the respective input signals 11 for extracting the first through the N-th samples in the frame period from the respective input signals at the first through the M-th unit intervals which are in one-to-one correspondence to the first through the M-th bit rates.

Responsive to the detection signals 21, a time slot administration circuit 22 produces a control signal 23, a sample or channel arrangement information signal 24, and an informing signal 25. The control signal 23 and the sample arrangement information signal 24 will become clear as the description proceeds. The informing signal 25 is for use in informing the respective channel units 16 to 20 whether or not the input signals 11 of the first through the N-th channels CH1 to CHN are arranged in each of the frames in the order of the channel numbers. The time slot administration circuit 22 will later be described in detail.

Responsive to the control signal 23, a sample memory circuit 26 memorizes the first multiplexed signal and produces a sample memory output signal. A second multiplexer 27 multiplexes the sample memory output signal and the sample arrangement information signal 24 to produce the output signal 12. Operation of the sample memory circuit 26 and the second multiplexer 27 will later be described in detail.

Figure 2:
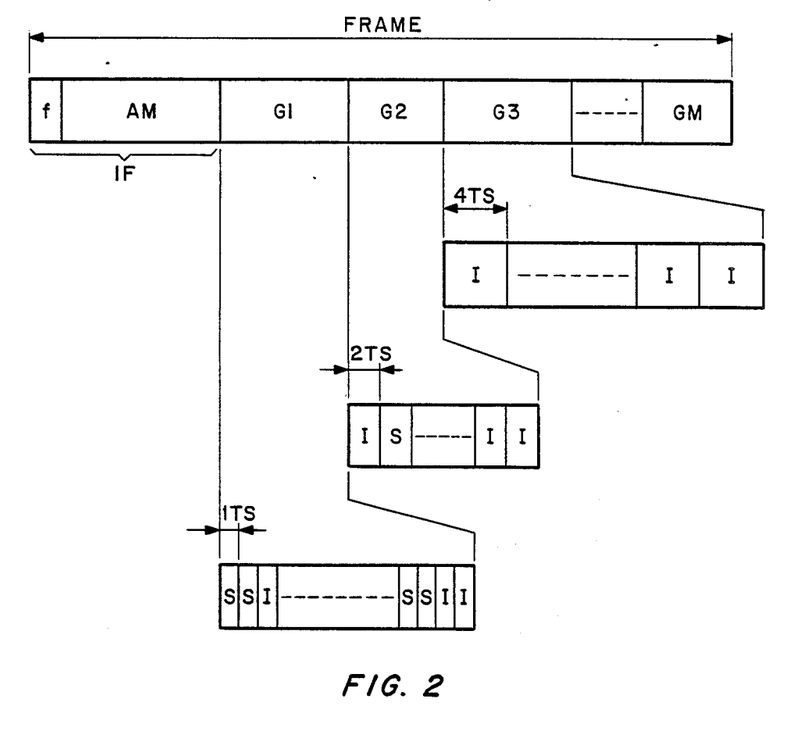
FIG. 2 is an output signal format for use in describing operation of the time division multiplexing device illustrated in FIG. 1.

Turning to FIG. 2, a certain frame is illustrated among the successive frames of the output signal 12 (FIG. 1). The illustrated frame has first through M-th fields G1, G2, G3, ..., and GM successively consecutively in the frame under consideration. Each of other frames has also the first through M-th fields G1 to GM. The first through the M-th fields G1 to GM of each of the successive frames are in one-to-one correspondence to the first through the M-th unit intervals and has a total time duration which is equal to the frame period minus or less a predetermined time duration. The first through the N-th samples are arranged in the first through the M-th fields G1 to GM of the respective frames with the significant samples selected in each of the frames. Each of the significant samples is arranged with preference to the insignificant samples and labeled "S" while the insignificant samples are labeled "I."

In each of the successive frames, the sample arrangement information signal 24 (FIG. 1) is placed in an information field IF which has the predetermined time duration. More specifically, the sample arrangement information signal 24 is placed in an assignment message field having a time duration which is equal to the predetermined time duration minus or less a prescribed time duration which provides a frame synchronization field for a frame synchronization bit. The frame synchronization bit defines each of the frames.

In the illustrated frame, the first field G1 is for the samples of a first kind extracted from the input signals 11 (FIG. 1). Each sample of the first kind is the first unit interval long. The first unit interval will now be understood to be the shortest among the first through the M-th unit intervals. Each sample of the first kind is placed in a first time interval which is equal in duration to a unit time slot labeled "1TS." The second field G2 is for the samples of a second kind extracted from the input signals 11, each of which has a duration of the second unit interval. It will be assumed that the second unit interval is twice the first unit interval long. Each sample of the second kind is placed in a second time interval which is equal in length to twice the unit time slot and labeled "2TS." Likewise, the third field G3 is for the samples of a third kind, each of which is the third unit interval long. It will be assumed that the third unit interval has a duration which is equal to two second unit intervals. Each sample of the third kind is placed in a third time interval which is equal to four times the unit time slot and therefore labeled "4TS."

Figure 3:
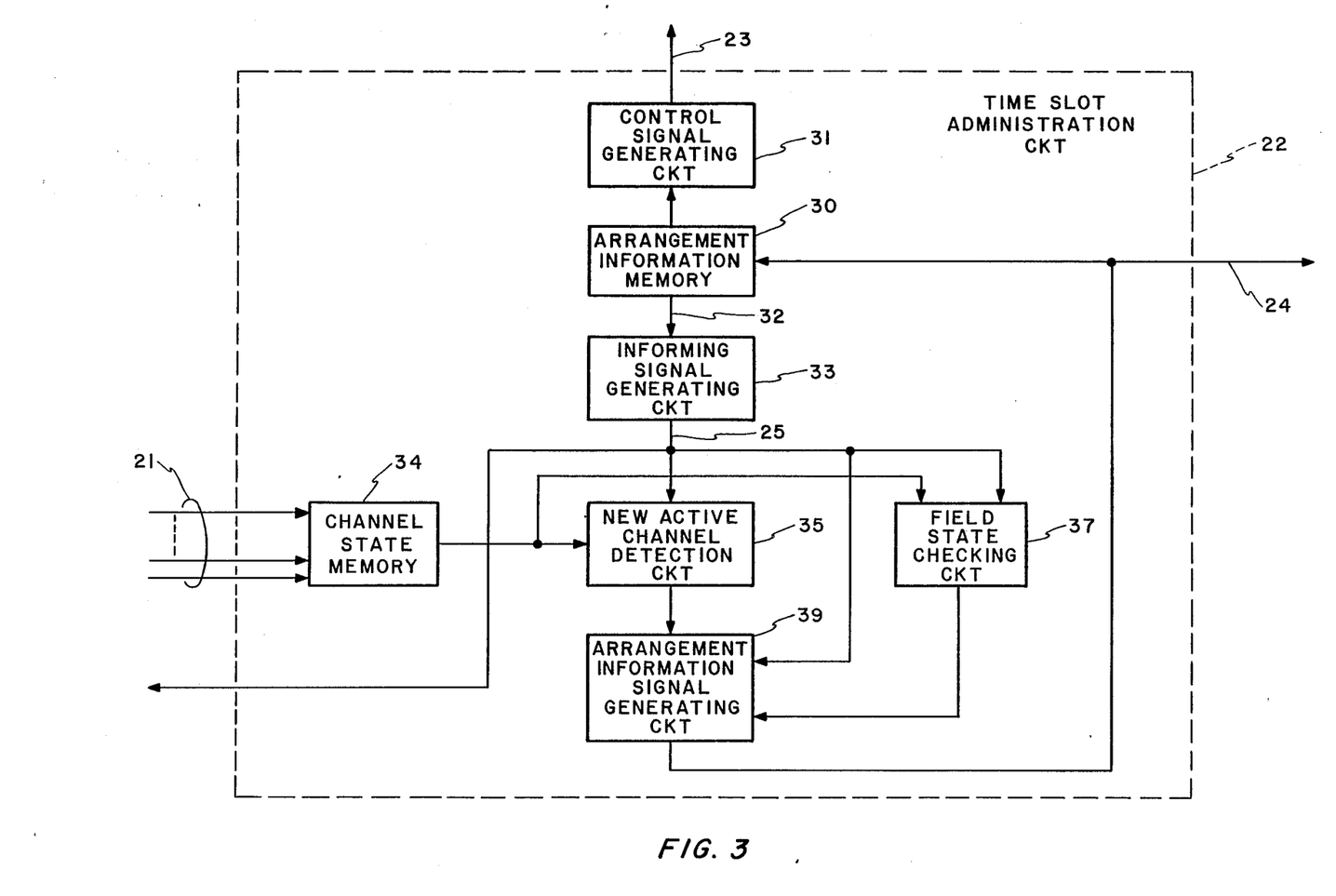
FIG. 3 is a block diagram of a time slot administration circuit for use in the time division multiplexing device illustrated in FIG. 1.

Referring to FIG. 3, the time slot administration circuit 22 comprises an arrangement information memory 30 for memorizing the sample arrangement information signal 24. In the manner which will later become clear, the sample arrangement information signal 24 successively represents the channel numbers of the samples which should be arranged in the first through the M-th fields of each frame of the output signal 12 (FIG. 1). The arrangement information memory 30 has first through N-th memory areas (not shown) and successively memorizes in the first through the N-th memory areas the channel numbers represented by the sample arrangement information signal 24.

A control signal generating circuit 31 generates the control signal 23 with reference to the channel numbers in the arrangement information memory 30. The control signal 23 comprises write and read address signal. The write address signal successively represents writing addresses of the sample memory circuit 26 (FIG. 1) only for the samples of the channel numbers memorized in the arrangement information memory 30.

Referring to FIGS. 1 and 3, description will be made as regards operation of the sample memory circuit 26. It should be noted that the sample memory circuit has first through N-th memory regions (not shown). Supposing that the channel number for the first sample is memorized in the second memory area of the arrangement information memory 30, the control signal generating circuit 31 generates the write address signal representative of the address corresponding to the second memory region to make the sample memory circuit 26 memorize the first sample in the second memory region. If the channel number for the second sample is memorized in the first memory area of the arrangement information memory 30, the control signal generating circuit 31 generates the write address signal representative of the address corresponding to the first memory region to make the sample memory circuit 26 memorize the second sample in the first memory region. If the channel number for the third sample is not memorized in the arrangement information memory 30, the control signal generating circuit 31 does not generate the write address signal to inhibit writing of the third sample in the sample memory circuit 26. Thus, the sample memory circuit 26 memorizes only the samples indicated by the channel numbers memorized in the arrangement information memory 30.

The read address signal of the control signal 23 is representative of reading addresses of the sample memory circuit 26. The reading addresses sequentially increase one by one from the first memory region to the last memory region in which the last sample is memorized. Thus, the sample memory circuit 26 produces the samples as the sample memory output signal in response to the read address signal. The sample memory output signal and the sample arrangement information signal 24 are multiplexed into the output signal 12 by the second multiplexer 27 as described above.

Thus, a combination of the sample memory circuit 26 and the second multiplexer 27 serves as an arranging circuit responsive to the control signal 23 for arranging the first through the N-th samples in the first through the M-th fields of the respective frames to produce the output signal 12 with the significant samples selected in each of the frames with preference to the insignificant samples and with the sample arrangement information signal 24 placed in the information field which has the predetermined time duration in each of the frames.

In FIG. 3, an informing signal generating circuit 33 generates, with reference to the channel numbers memorized in the arrangement information memory 30, the informing signal 25 for use in informing the respective channel units 16 to 20 (FIG. 1) whether or not the input signals 11 of the first through the N-th channels CH1 to CHN are arranged in each of the frames in the order of the channel numbers.

A channel state memory 34 has first through N-th memorizing sections (not shown). The channel state memory 34 memorizes the detection signals 21 of the first through N-th channel units 16 to 20 in the first through the N-th memorizing sections as memorized detection signals, respectively, and thereafter gives a new active channel detection circuit 35 the memorized detection signals in synchronism with the informing signal 25.

More specifically, the new active channel detection circuit 35 simultaneously receives the informing signal 25 for one of the first through the N-th channels CH1 to CHN and the memorized detection signal for the one of the first through the N-th channels CH1 to CHN. The memorized detection signal is representative of the channel state information of the one of the first through the N-th channels CH1 to CHN. As described above, the channel state information represents presence or absence of the significant signal in the one of the first through the N-th channels CH1 to CHN and furthermore represents the bit rate of the one of the first through the N-th channels CH1 to CHN.

The new active channel detection circuit 35 detects, as detected information, the channel state information representing the presence of the significant signal when the informing signal 25 represents the channel unarranged in the current frame of the output signal 12 (FIG. 1). The channel in which the significant signal newly appears will be called a new active channel. The new active channel detection circuit 35 also detects the new active channel by a timing at which the detected information is produced. When the new active channel is detected, the new active channel detection circuit 35 produces both the channel number of the new active channel and the unit interval of the new active channel as an assignment request signal representative of a request for assignment of the new active channel with a time slot of each of the frames which succeeds the current frame.

With reference to the informing signal 25 and the bit rates for the respective channels memorized in the channel state memory 34, a field state checking circuit 37 checks whether or not the samples for the channels of a common unit interval are collectively arranged in one of the frames of the output signal 12 (FIG. 2). The field state checking circuit 37 furthermore checks whether or not at least one of the insignificant samples is arranged in a leading edge portion of each of the second through the M-th fields and whether or not at least one of the insignificant samples is arranged in a trailing edge portion of each of the first through the (M−1)-th fields. When at least one of the insignificant samples is not arranged in the leading edge portion and/or the trailing edge portion, the field state checking circuit 37 produces an arrangement position signal representing a position at which the insignificant sample in question is not arranged. Otherwise, the field state checking circuit 37 produces a refresh instruction signal which will become clear as the description proceeds.

Responsive to the assignment request signal, an arrangement information signal generating circuit 39 investigates a multiplexed state of the current frame of the output signal 12 with reference to the informing signal 25 to assign the new active channel with a part of one of the first through the M-th fields of a next succeeding frame which next succeeds the current frame in the manner which will presently be described.

Responsive also to the arrangement position signal, the arrangement information signal generating circuit 39 investigates the multiplexed state of the current frame of the output signal 12 to interchange, as will be described later, at least one significant sample indicated by the arrangement position signal an at least one insignificant sample positioned within the field including the last-mentioned at least one significant sample that is indicated by the arrangement position signal.

The arrangement information signal generating circuit 39 thereafter produces the sample arrangement information signal 24 which represents a difference in the channel numbers between the current frame of the output signal 12 and the next succeeding frame of the output signals 12. Responsive to the arrangement information signal representative of the difference, the arrangement information memory 30 newly memorizes a new channel number indicated by the difference instead of the channel number indicated by the difference.

In practice, the control signal producing step proceeds concurrently with the control signal changing step. In other words, a part of the sample arrangement information signal is used in the control signal. It is nevertheless possible to understand that the control signal is produced in the producing step and is changed to the sample arrangement information signal in the changing step.

Figure 4:
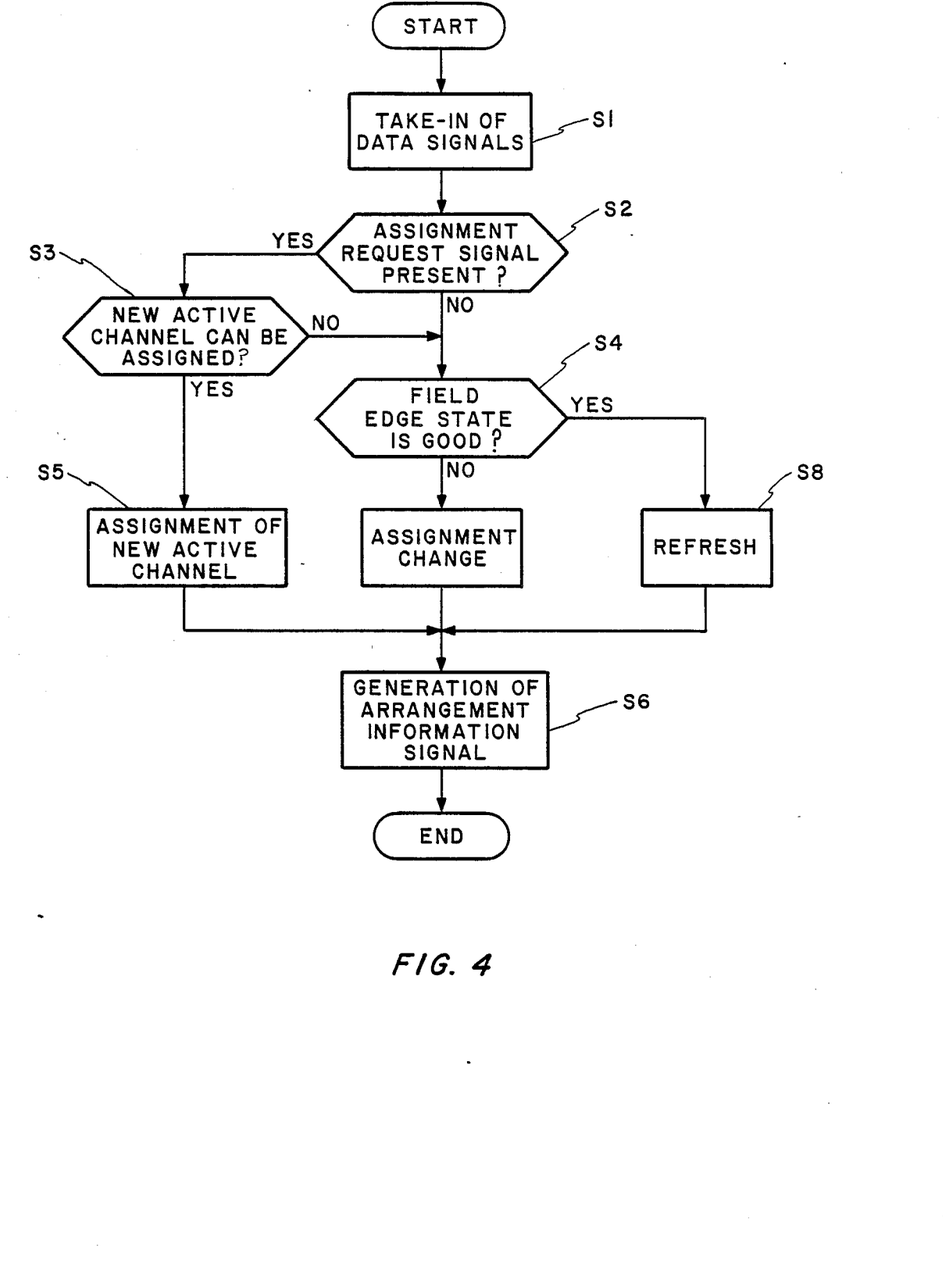
FIG. 4 is a flow chart for use in describing operation of the time slot administration circuit illustrated in FIG. 3.

Referring to FIGS. 3 and 4, a detailed description will now be made as regards operation of the arrangement information signal generating circuit 39. At a first stage S1, the arrangement information signal generating circuit 39 takes in data signals which are output signals sent from the informing signal generating circuit 32, the new active channel detection circuit 35, and the field state checking circuit 37.

At a second stage S2 following the first stage S1, check operation is carried out whether or not the assignment request signal is present. As described above, the assignment request signal carries the channel number of the new active channel and the unit interval of the new active channel. When the assignment request signal is present, the second stage S2 is followed by a third stage S3. Otherwise, the second stage S2 is followed by a fourth stage S4 which will become clear as the description proceeds.

At the third stage S3, judgement is made whether or not it is possible to assign the significant sample of the new active channel to a part of the next succeeding frame which next succeeds the current frame.

Description will be made more in detail as regards the third stage S3. It will be assumed that the new active channel has the second bit rate corresponding to the second unit interval 2TS (FIG. 2). The samples of the new active channel can be arranged in the second field G2 (FIG. 2) when at least one insignificant sample is present in the second field G2 of the current frame of the output signal 12 (FIG. 1).

Thus, the arranging step or operation is carried out in the second field G2 of a P-th frame of the successive frames by discarding one of the insignificant samples, as a discarded sample. The discarded sample becomes one of the significant samples in a Q-th frame which is later than the P-th frame. The last-mentioned one of the significant samples is arranged as a new sample in the second field G2 of the P-th frame, in place of the discarded sample.

Even when no insignificant sample is present in the second field G2 of the current frame of the output signal 12 (FIG. 1), the significant sample of the new active channel can be arranged in one of the first and the third fields G1 and G3 contiguous or adjacent to the second field G2 in a first and a second case which will be described in the following.

In the first case, there is a predetermined number of the insignificant samples having a total time duration capable of arranging the significant sample of the new active channel in the trailing edge portion of the first field G1. In the example being depicted in FIG. 2, there are two insignificant samples in the trailing edge portion of the first field G1. It is therefore possible to arrange the significant sample of the new active channel instead of the two insignificant samples placed in the trailing edge portion of the first field G1.

In the second case, there is a predetermined number of the insignificant samples having a total time duration capable of arranging the significant sample of the new active channel in the leading edge portion of the third field G3. In the example being illustrated, there is one insignificant sample in the leading edge portion of the third field G3. The significant samples of the new active channel can therefore be arranged instead of one insignificant sample that is placed in the leading edge portion of the third field G3.

Thus, when a time duration of the second field G2 should be lengthened in order to arrange within the second field G2 the significant samples extracted at the second unit interval which is in a one-to-one correspondence with the second field G2, the arranging step or operation is carried out by discarding at least one of the insignificant samples in one of the first through the M-th fields that is contiguous to the second field G2.

When it is possible to assign the significant sample of the new active channel to a part of the next succeeding frame, the third stage S3 is followed by a fifth stage S5 at which assignment of the new active channel is carried out. Otherwise, the third stage S3 is followed by the fourth stage S4 which will presently be described.

The fifth stage S5 is followed by a sixth stage S6 at which operation is carried out to generate the sample arrangement information signal 24 for the difference in the channel numbers between the current frame and the next succeeding frame by the arrangement information signal generating circuit 39.

As a result, the samples for the channels having the same bit rate are collectively arranged in each of the frames of the output signal 12. Inasmuch as the samples for the channels having the same bit rate are not separately arranged in each of the frames of the output signal 12, it is possible to readily control the device. Inasmuch as a plurality of contiguous time slots can be assigned to one of the channels, it is possible to shorten the time needed for time slot assignment operation.

At the fourth stage S4, the leading and/or the trailing edge portions are checked or judged in each of the first through the M-th fields. Such judgement is made whether or not each edge portion consists of at least one insignificant sample of the unit interval which is equal to or longer than one sample of a field contiguous to the field under consideration. When a result of the judgement is negative, operation proceeds to a seventh stage S7. When the result is affirmative, the fourth stage S4 is followed by an eighth stage S8.

At the seventh stage S7, the sample assignment change operation is carried out so that each of the first through the M-th fields has, in the leading and/or the trailing edge portions, at least one insignificant sample of the unit interval which is equal to or longer than one sample of the field contiguous to the field in question. The seventh stage S7 succeeds the above-mentioned sixth stage S6.

At the eighth stage S8, refresh or renewal information is produced. The refresh information is for use in informing a counterpart time division demultiplexing device (later illustrated) whether or not the first through the N-th channels CH1 to CHN are arranged in each of the frames. At the sixth stage S6, the refresh information is sent to the demultiplexing device through a digital transmission line as the arrangement information signal 24. When the demultiplexing device already receives and memorizes an erroneous sample arrangement information signal accompanied by bit errors introduced on the digital transmission line, sending operation of the refresh information is used to correct the erroneous sample arrangement information signal at the demultiplexing device.

Figure 5:
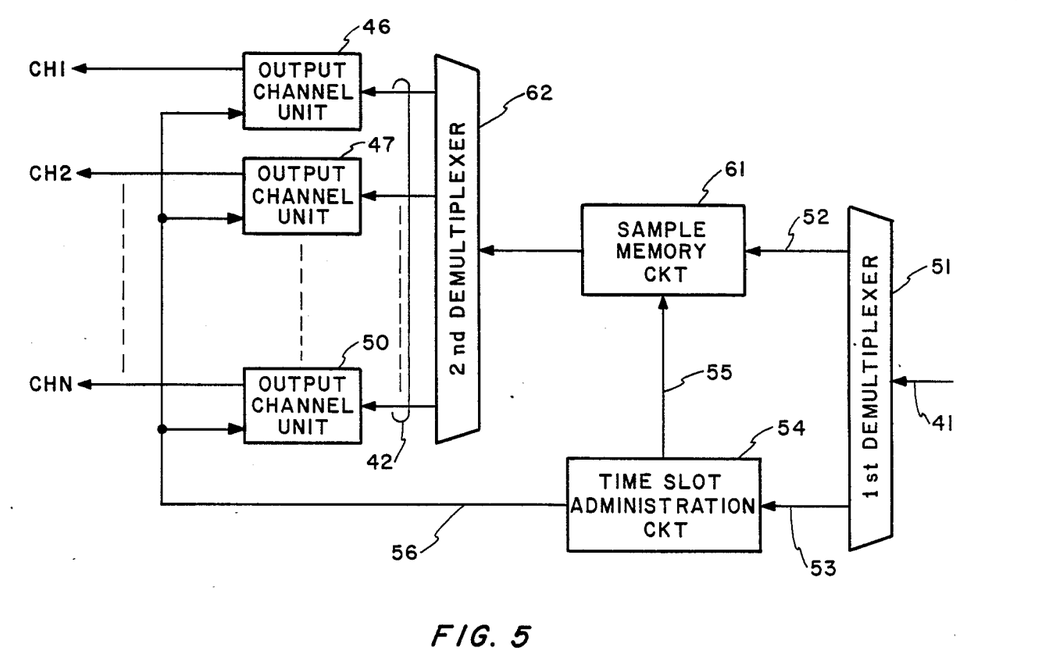
FIG. 5 is a block diagram of a time division demultiplexing device for use as a counterpart of the time division multiplexing device illustrated in FIG. 1.

Referring to FIG. 5, description will be made as regards a time division demultiplexing device for use as a counterpart of the multiplexing device thus far been described. The demultiplexing device is supplied with the output signal 12 (FIG. 1) as an incoming signal 41 and is for demultiplexing the incoming signal 41 into a plurality of outgoing signals 42 in a time division fashion. The incoming signal 41 therefore has the predetermined frame period which defines successive frames of the incoming signal 41. The incoming signal 41 is also produced in the multiplexing device by time division multiplexing the sample memory output signal of the sample memory circuit 26 and the sample arrangement information signal 24. The outgoing signals 42 are transmitted or assigned to first through N-th output or reception channels CH1, CH2, . . . , and CHN through first through N-th output or reception channel units 46, 47, . . . , and 50, respectively, where N represents the above-mentioned integer. The outgoing signals 42 are therefore identified by first through N-th output or reception channel numbers. The outgoing signals 42 have first through M-th bit rates, where M represents the above-mentioned natural number. The first through the N-th output channels CH1 to CHN are corresponding to the first through the N-th channels CH1 to CHN illustrated in FIG. 1.

The demultiplexing device comprises a first demultiplexer 51 responsive to the incoming signal 41 for time-division demultiplexing the incoming signal 41 into a sample memory input signal 52 and a reproduced sample arrangement information signal 53. The sample memory input signal 52 has to be identical with the sample memory output signal of the sample memory circuit 26 (FIG. 1). The reproduced sample arrangement information signal 53 has to be identical with the sample arrangement information signal 24 (FIG. 1).

Responsive to the reproduced sample arrangement information signal 53, a reception time slot administration circuit 54 produces a reproduced control signal 55 and a reproduced informing signal 56. The reproduced control signal 47 will become clear as the description proceeds. The reproduced informing signal 56 is similar to the informing signal 25 (FIG. 1) and is for use in informing the respective reception channel units 46 to 50 whether or not the outgoing signals 42 of the first through the N-th reception channels CH1 to CHN are arranged in each of the frames in the order of the reception channel numbers.

Figure 6:
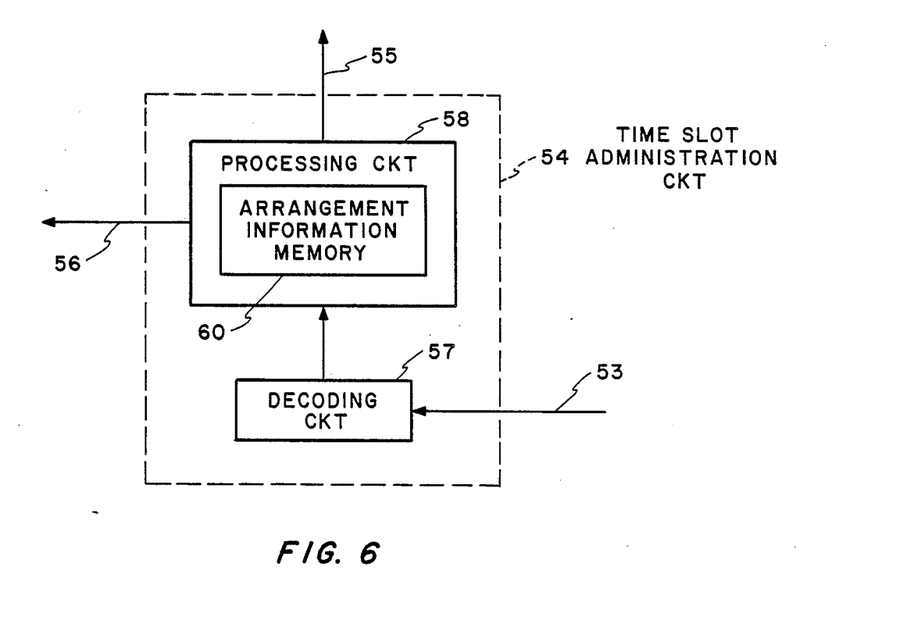
FIG. 6 is a block diagram of a reception time slot administration circuit for use in the time division demultiplexing device illustrated in FIG. 5.

Turning to FIG. 6 for a short while, the reception time slot administration circuit 54 comprises a decoding circuit 57 for decoding the reception sample arrangement information signal 53 into a decoded signal. In a first case, the decoded signal successively represents the channel numbers of the samples arranged in the first through M-th fields of each frame of the incoming signal 41 as described with reference to FIG. 3. In a second case, the decoded signal represents the difference in channel numbers between two of the successive frames as described about the sixth stage S6 in conjunction with FIG. 4. In a third case, the decoded signal represents the refresh information described as regards the eighth stage S8 in connection with FIG. 4.

Responsive to the decoded signal, a processing circuit 58 processes the decoded signal into the reproduced control signal 55 and the reproduced informing signal 56. The processing circuit 58 comprises a reception arrangement information memory 60 which is similar to the arrangement information memory 30 (FIG. 3). Like the arrangement information memory 30, the reception arrangement information memory 60 has first through N-th memory areas (not shown) and successively memorizes in the first through the N-th memory areas the channel numbers represented by the decoded signal.

The channel numbers memorized in the memory areas of the reception arrangement information memory 60 is renewed by the decoded signal representing the refresh information, the difference in the channel numbers between two of the successive frames, and the like.

The processing circuit 58 further comprises a reception control signal generating circuit (not shown) for generating the reproduced control signal 55 with reference to the channel numbers memorized in the arrangement information memory 60 and a reception informing signal generating circuit (not shown) which is similar to the informing signal generating circuit 33 (FIG. 3). The reception informing signal generating circuit generates the informing signal 56 with reference to the channel numbers memorized in the arrangement informing memory 60. The reception control signal generating circuit is similar to the control signal generating circuit 31 (FIG. 3).

Turning back to FIG. 5, a reception sample memory circuit 61 is supplied with the sample memory input signal 52. The samples identified by the channel numbers appear in the sample memory input signal 52 in the manner described in conjunction with the multiplexing device (FIG. 1). Under the control of the control signal 55, the reception sample memory circuit 61 memorizes the samples and produces a circuit output signal with the samples arranged in the order of the channel numbers.

Responsive to the circuit output signal, a second demultiplexer 62 demultiplexes the circuit output signal into the outgoing signals 42 for the respective output channels CH1 to CHN.

Figure 7:
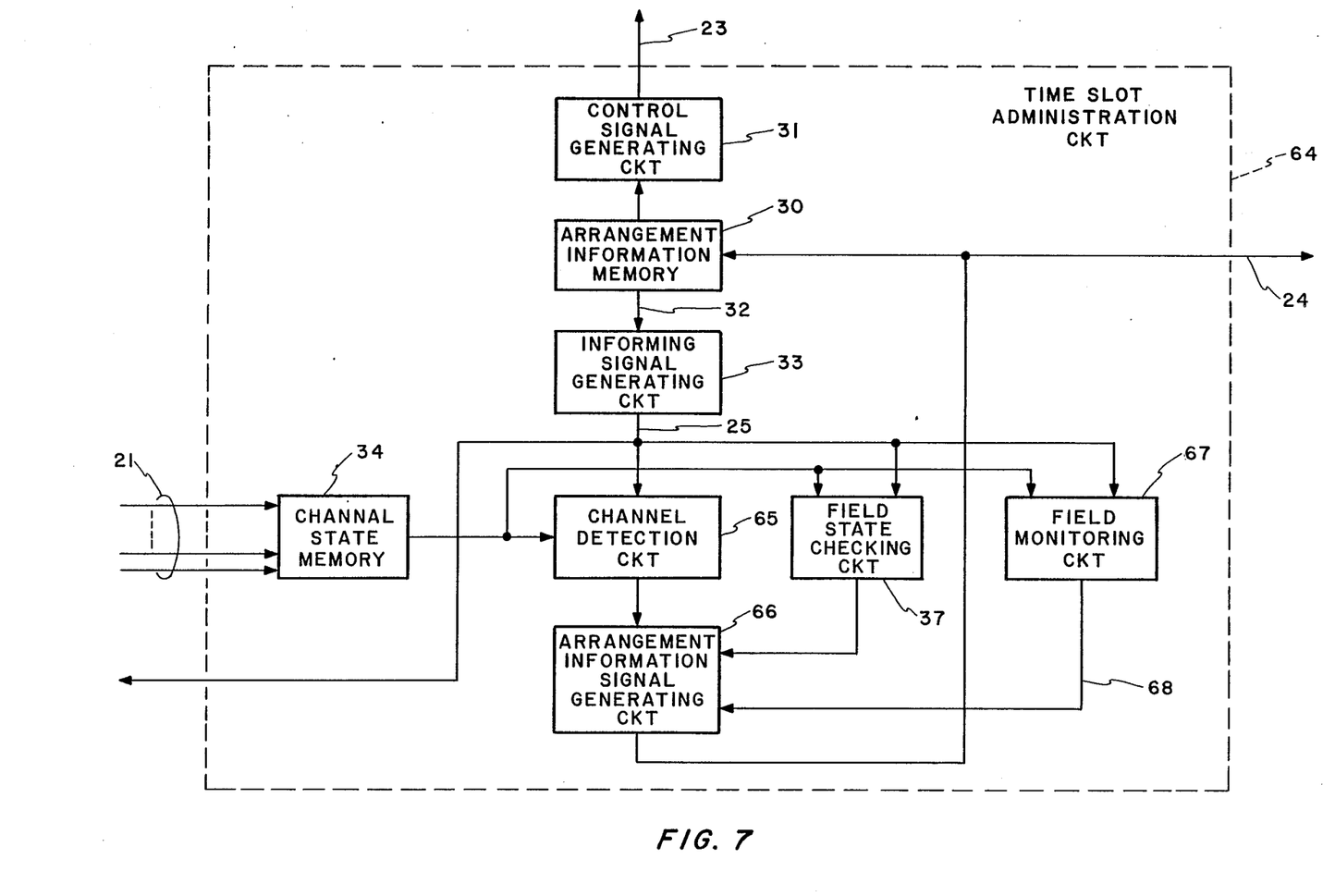
FIG. 7 is a block diagram of another time slot administration circuit for use in the time division multiplexing device illustrated in FIG. 1.

Referring to FIG. 7, a description will be made as regards another time slot administration circuit 64 which can be used instead of the time slot administration circuit 22 illustrated in FIG. 3. The administration circuit 64 is similar to the time slot administration circuit 22 (FIG. 3) except that a channel detection circuit 65 and another arrangement information signal generating circuit 66 are used instead of the new active channel detection circuit 35 and the arrangement information signal generating circuit 39, respectively, and that a field monitoring circuit 67 is coupled to the informing signal generating circuit 33, the arrangement information signal generating circuit 66, the channel state memory 34, and the field state checking circuit 37.

A description will now be made as regards the channel detection circuit 65. The channel state memory 34 memorizes the detection signals 21 of the first through the N-th channel units 16 to 20 in the first through the N-th memory sections thereof as memorized detection signals, respectively, and thereafter gives the channel detection circuit 65 the memorized detection signals in synchronism with the informing signal 25. That is, the channel detection circuit 65 simultaneously receives the informing signal 25 for one of the first through the N-th channels CH1 to CHN and the memorized detection signal for that one of the first through the N-th channels CH1 to CHN. The memorized detection signal is representative of the channel state information of that one of the first through the N-th channels CH1 to CHN. As mentioned above, the channel state information represents the presence (namely, a significant channel) or absence (namely, an insignificant channel) of the significant signal in that one of the first through the N-th channels CH1 to CHN and furthermore represents the bit rate of that one of the first through the N-th channels CH1 to CHN. Like the new active channel detection circuit 35 (FIG. 3), the channel detection circuit 65 detects the new active channel with reference to the informing signal 25 and the channel state information represented by the memorized detection signals and produces a new active channel state information signal representative of the channel number of the new active channel and unit interval used for the new active channel. The new active channel state information signal serves as an assignment request signal representative of a request for assignment of the new active channel with a time slot of the frame which succeeds the current frame.

The channel detecting circuit 65 furthermore detects the channel state information for arranged channels which are arranged in the current frame of the successive frames of the output signal 12 (FIG. 1) to produce an arranged channel state information signal representative of the channel state information of each of the arranged channels.

The description will proceed to the field monitoring circuit 67. With reference to the informing signal 25 and the bit rates memorized for the respective channels in the channel state memory 34, the field monitoring circuit 67 calculates a ratio S/I which is indicative of a ratio of the number of the significant samples S to the number of the insignificant samples I for each of the first through the M-th fields and checks whether or not fluctuation or variation among the ratios S/I for the first through the M-th fields falls within a predetermined allowable range to produce a check result signal 68. If a certain one of the first through the M-th fields is high in the ratio S/I, the certain field has a large number of the significant samples S in comparison with the number of the insignificant samples I. If another of the first through the M-th fields is small in the ratio S/I, the insignificant samples I is greater in number than the significant samples S.

Responsive to the check result signal 68 representative of a negative result, the arrangement information signal generating circuit 66 arranges the insignificant samples I so that the fluctuation in the ratio S/I is kept within the predetermined allowable range. Such operation of the arrangement information signal generating circuit 66 will presently be described.

Figure 8:
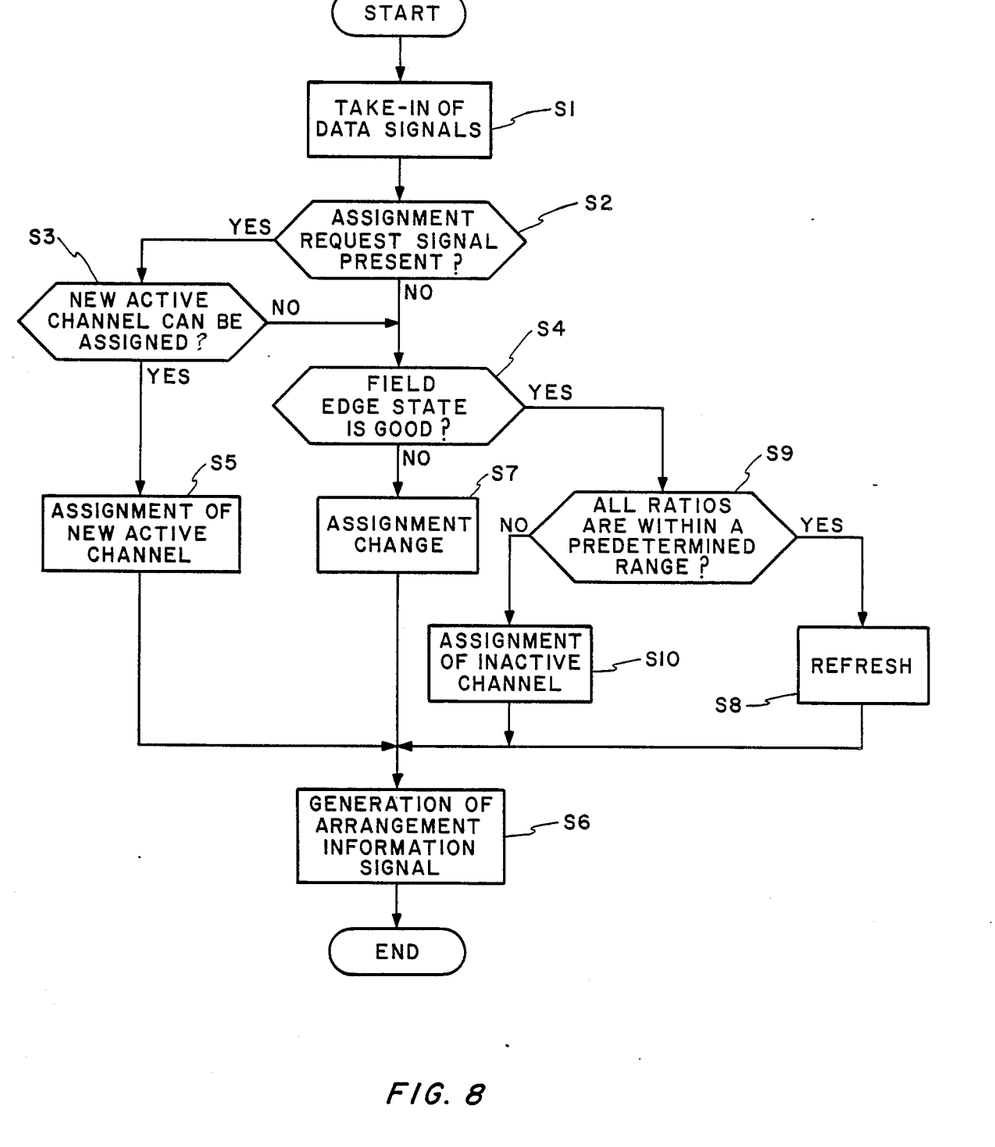
FIG. 8 is another flow chart for use in describing operation of the time slot administration circuit illustrated in FIG. 7.

In FIG. 8, the operation of the arrangement information signal generating circuit 66 (FIG. 7) is shown in and is similar to operation of the arrangement information signal generating circuit 39 (FIG. 3) as shown in FIG. 4 except that the former has additional ninth and tenth stages S9 and S10. Therefore, similar stages are shown by the same stage numbers as in FIG. 4 and description thereto is omitted here.

Referring to FIG. 8, when the result of the judgement at the stage S4 is affirmative, the stage proceeds to the ninth stage S9 at which judgement is made whether or not the fluctuation in the ratio S/I among the first through the M-th fields falls within the predetermined allowable range. When a result of the judgement is negative, operation proceeds to the tenth stage S10 at which the number of the insignificant samples I in respective fields is controlled so that the fluctuation falls within the predetermined allowable range.

Now, assuming that the first field G1 (FIG. 2) has a first ratio S/I equal to 30% while the second field G2 (FIG. 2) has a second radio S/I equal to 50%, one unarranged insignificant sample to be assigned to the second field G2 is assigned at the tenth stage S10 to the channels for two insignificant samples I arranged in the first field G1. As a result, the first and the second ratios S/I approach to each other. Therefore, different fields can serve for transmission of new active or significant channels thereto with an even or equal probability.

Thus, when a time duration of the second field G2 should be lengthened in order to arrange, within the second field G2, the insignificant sample extracted at the second unit interval which is in a one-to-one correspondence to the second field G2, the arranging step or operation is carried out by discarding at least one of the insignificant samples in one of the first through the M-th fields that is contiguous to the second field G2.

Thereafter, the tenth stage S10 proceeds to the sixth stage S6.

When the result of the judgement at the ninth stage S9 is affirmative, operation proceeds to the eighth stage S8.

While this invention has thus far been described in conjunction with an embodiment thereof, it will readily be possible for those skilled in the art to put this invention into practice in various other manners. For example, each of the time division multiplexing device illustrated in FIG. 1 and the time division demultiplexing device illustrated in FIG. 5 may be made to operate under control of software.

What is claimed is:

1. A method of time division multiplexing input signals identified by a first through an N-th channel number and having a first through an M-th bit rate into an output signal having a predetermined frame period which defines successive frames of said output signal, N representing an integer greater than one, M representing a natural number which is not greater than said integer, said method comprising the steps of:

extracting a first through an N-th sample in said frame period from said input signals at a first through an M-th unit interval which are in one-to-one correspondence to said first through said M-th bit rates, said first through said N-th samples being identified by said first through said N-th channel numbers, respectively, and being classifiable into significant and insignificant samples in each of said frames;

producing a control signal in response to the input signals of said first through said N-th channel numbers, said control signal indicating a first through an M-th field successively consecutively in each of said frames and furthermore indicating whether said first through said N-th samples are the significant or the insignificant samples in each of said frames, said first through said M-th fields of each of said frames being in one-to-one correspondence to said first through said M-th unit intervals and having a total time duration which is equal to said frame period minus a predetermined time duration;

changing said control signal to a sample arrangement information signal indicative of said first through said M-th fields in each of said frames; and arranging said first through said N-th samples in the first through the M-th fields of each of said frames in response to said control signal to produce said output signal with the significant samples selected in each of said frames with preference to the insignificant samples and with said sample arrangement information signal placed in an information field which has said predetermined time duration in each of said frames.

2. A method as claimed in claim 1, wherein said arranging step is for arranging at least one of said first through said N-th samples in each of said first through said M-th fields.

3. A method as claimed in claim 2, wherein said changing step is for making said sample arrangement information signal indicate the channel number of at least one of said first through said N-th samples that is arranged in each of said first through said M-th fields of each of said frames.

4. A method has claimed in claim 3, said successive frames including a P-th frame, P representing a positive integer, the first through the M-th fields of said P-th frame having various time durations, respectively, wherein said arranging step is carried out, when the time duration of an m-th field of said P-th frame should be lengthened in order to arrange in said m-th field the significant samples extracted at an m-th unit interval which is in a one-to-one correspondence to said m-th field where m represents one of 1 through M, both inclusive, by discarding at least one of the insignificant samples in one of the first through the M-th fields of said P-th frame, said one of the first through the M-th fields of said P-th frame being contiguous to said m-th field.

5. A method as claimed in claim 4, wherein said arranging step is carried out, when the time duration of an m'-th field should be lengthened in order to arrange in said m'-th field the significant samples extracted at an m'-th unit interval which is in one-to-one correspondence to said m'-th field where m' represents one of 1 through (M−1), both inclusive, by discarding at least one of the insignificant samples in an (m'+1)-th field as a discarded sample, said discarded sample being contiguous to said m'-th field.

6. A method as claimed in claim 4, wherein said arranging step is carried out, when the time duration of an m'-th field should be lengthened in order to arrange in said m'-th field the significant samples extracted at an m'-th unit interval which is in one-to-one correspondence to said m'-th field m' represents one of 2 through M, both inclusive, by discarding at least one of the insignificant samples in an (m'−1)-th field as a discarded sample, said discarded sample being contiguous to said m'-th field.

7. A method as claimed in claim 3, said successive frames including a P-th frame and a Q-th frame, P representing a first positive integer, Q representing a second positive integer greater than first positive integer, wherein:

said arranging step is carried out in an m-th field of said P-th frame by discarding one of the insignificant samples as a discarded sample, m representing one of 1 through M, both inclusive, said discarded sample becoming one of the significant samples in said Q-th frame, and by arranging the last-mentioned one of the significant samples in the m-th field of said Q-th frame in place of said discarded sample as a new sample;

said changing step being carried out to make said sample arrangement information signal indicate in said Q-th frame the channel number of said new sample in place of the channel number by which said discarded sample was indicated in said P-th frame.

8. A device for time division multiplexing input signals identified by a first through an N-th channel number and having a first through an M-th bit rate into an output signal having a predetermined frame period which defines successive frames of said output signal, N representing an integer greater than one, M representing a natural number which is not greater than said integer, said device comprising:

extracting means responsive to said input signals for extracting a first through an N-th sample in said frame period from said input signals at a first through an M-th unit interval which are in one-to-one correspondence to said first through said M-th bit rates, said first through said N-th samples being identified by said first through said N-th channel numbers, respectively, and being classifiable into significant and insignificant samples in each of said frames;

producing means responsive to the input signals of said first through said N-th channel numbers for producing a control signal indicating a first through an M-th field successively consecutively in each of said frames and furthermore indicating whether said first through said N-th samples are the significant or the insignificant samples in each of said frames, said first through said M-th fields of each of the frames being in one-to-one correspondence to said first through said M-th unit intervals and having a total time duration which is equal to said frame period minus a predetermined time duration, changing means for changing said control signal to a sample arrangement information signal indicative of said first through said M-th fields in each of said frames; and arranging means responsive to said control signal for arranging said first through said N-th samples in the first through the M-th fields of each of said frames to produce said output signal with the significant samples selected in each of said frames with preference to the insignificant samples and with said sample arrangement information signal placed in an information field which has said predetermined time duration in each of said frames.

9. A device as claimed in claim 8, wherein said arranging means is for arranging at least one of said first through said N-th samples in each of said first through said M-th fields.

10. A method as claimed in claim 9, wherein said changing means is for making said sample arrangement information signal indicate the channel number of at least one of said first through said N-th samples that is arranged in each of said first through said M-th fields of each of said frames.

11. A device as claimed in claim 10, said successive frames including a P-th frame, P representing a positive integer, the first through the M-th fields of said P-th frame having various time durations, respectively, wherein said arranging means is for discarding, when the time duration of an m-th field of said P-th frame should be lengthened in order to arrange in said m-th field the significant samples extracted at an m-th unit interval which is in one-to-one correspondence to said m-th field where m represents one of 1 through M, both inclusive, at least one of the insignificant samples in one of the first through the M-th fields of said P-th frame that is contiguous to said m-th field.

12. A device as claimed in claim 11, wherein said arranging means is for discarding, when the time duration of an m'-th field should be lengthened in order to arrange in said m'-th field the significant samples extracted at an m'-th unit interval which is in a one-to-one correspondence to said m'-th field where m' represents one of 1 through (M− 1), both inclusive, at least one of the insignificant samples in an (m'+1)-th field as a discarded sample, said discarded sample being contiguous to said m'-th field.

13. A device as claimed in claim 11, wherein said arranging means is for discarding, when the time duration of an m'-th field should be lengthened in order to arrange in said m'-th field the significant samples extracted at an m'-th unit interval which is in one-to-one correspondence to said m'-th field where m' represents one of 2 through M, both inclusive, at least one of the insignificant samples in an (m'−1)-th field as a discarded sample, said discarded sample being contiguous to said m'-th field.

14. A device as claimed in claim 10, said successive frames including a P-th frame and a Q-th frame, P representing a first positive integer, Q representing a second positive integer greater than said first positive integer P, wherein:

said arranging means is for discarding in an m-th field of said P-th frame one of the insignificant samples as a discarded sample, m representing one of 1 through M, both inclusive, said discarded sample becoming one of the significant samples in said Q-th frame, and for arranging the last-mentioned one of the significant samples in the m-th field of said Q-th frame in place of said discarded sample as a new sample;

said changing means being for making said sample arrangement information signal indicate in said Q-th frame the channel number of said new sample in place of the channel number by which said discarded sample was indicated in said P-th frame.

15. A method as claimed in claim 3, said successive frames including a P-th frame, P representing a positive integer, the first through the M-th fields of said P-th frame having various time durations, respectively, wherein said arranging step is carried out when the time duration of an m-th field of said P-th frame should be lengthened in order to arrange within said m-th field the insignificant samples extracted at an m-th unit interval which is in a one-to-one correspondence with said m-th field where m represents one of 1 through M, both inclusive, said arranging step discarding at least one of the insignificant samples in one of the first through the M-th fields of said P-th frame, said one of the first through M-th fields of said P-th being contiguous to said m-th field.

16. A method as claimed in claim 15, wherein said arranging step is carried out, when the time duration of an m'-th field should be lengthened in order to arrange in said m'-th field the insignificant samples extracted at an m'-th unit interval which is one-to-one correspondence to said m'-th field where m' represents one of 1 through (M−1), both inclusive, by discarding at least one of the insignificant samples in an (m'+1)-th field as a discarded sample, said discarded sample being contiguous to said m'-th field.

17. A method as claimed in claim 15, wherein said arranging step is carried out, when the time duration of an m'-th field should be lengthened in order to arrange in said m'-th field the insignificant samples extracted at an m'-th unit interval which is in one-to-one correspondence to said m'-th field where m' represents one of 2 through M, both inclusive, by discarding at least one of the insignificant samples in an (m'−1)-th field as a discarded sample, said discarded sample being contiguous to said m'-th field.

* * * * *